(12) United States Patent
Lin et al.

(10) Patent No.: US 11,650,437 B1
(45) Date of Patent: May 16, 2023

(54) VARIFOCAL LENS DEVICE, CORRECTIVE LENS ASSEMBLY, AND OPTICAL DISPLAY SYSTEM

(71) Applicant: NATIONAL YANG MING CHIAO TUNG UNIVERSITY, Hsinchu (TW)

(72) Inventors: Yi-Hsin Lin, Hsinchu County (TW); Yi-Siang Tsai, Kaohsiung (TW); Ting-Wei Huang, Chiayi County (TW); Hao-Hsin Huang, Hsinchu County (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 0 days.

(21) Appl. No.: 17/739,796

(22) Filed: May 9, 2022

(30) Foreign Application Priority Data

Feb. 15, 2022 (TW) .................................. 111105386

(51) Int. Cl.
| | |
|---|---|
| *G02F 1/01* | (2006.01) |
| *G02B 27/01* | (2006.01) |
| *G02C 7/08* | (2006.01) |
| *G02F 1/139* | (2006.01) |

(52) U.S. Cl.
CPC ....... *G02F 1/0136* (2013.01); *G02B 27/0172* (2013.01); *G02C 7/083* (2013.01); *G02F 1/1396* (2013.01); *G02F 2203/06* (2013.01); *G02F 2203/07* (2013.01)

(58) Field of Classification Search
CPC .................................................. G02F 1/0136
See application file for complete search history.

(56) References Cited

U.S. PATENT DOCUMENTS

| | | | |
|---|---|---|---|
| 2014/0375706 A1* | 12/2014 | Lee ..................... | G09G 3/3611 345/697 |
| 2020/0348528 A1 | 11/2020 | Jamali et al. | |
| 2021/0014473 A1* | 1/2021 | Hua ....................... | G02B 30/10 |

OTHER PUBLICATIONS

Yu-Jen Wang and Yi-Hsin Lin, "Liquid crystal technology for vergence-accommodation conflicts in augmented reality and virtual reality systems: a review," Liquid Crystals Reviews, 9(1), pp. 35-64, 2021.

* cited by examiner

*Primary Examiner* — Edmond C Lau
(74) *Attorney, Agent, or Firm* — Ohlandt, Greeley, Ruggiero and Perle, LLP

(57) ABSTRACT

A varifocal lens device includes a lens unit and a polarization controller. The lens unit has different optical powers for different polarization directions of light. When a light beam is introduced into the varifocal lens device through the polarization controller in a first state, a polarization direction of the light beam is converted by the polarization controller. When the light beam is introduced into the varifocal lens device through the polarization controller in a second state, the polarization direction of the light beam is prevented from being converted by the polarization controller.

11 Claims, 18 Drawing Sheets

US 11,650,437 B1

VARIFOCAL LENS DEVICE, CORRECTIVE LENS ASSEMBLY, AND OPTICAL DISPLAY SYSTEM

CROSS-REFERENCE TO RELATED APPLICATION

This application claims priority of Taiwanese Invention Patent Application No. 111105386, filed on Feb. 15, 2022.

FIELD

The disclosure relates to a varifocal lens device, and more particularly to a varifocal lens device, a corrective lens assembly including at least one varifocal lens device, and an optical display system including at least one varifocal lens device.

BACKGROUND

A near-eye display (for example, a head-mounted display) for a virtual reality (VR) system, an augmented reality (AR) system, and so on, is used to create a virtual image in the field of view (FOV) for both eyes of a user. However, the near-eye display might cause symptoms such as visual fatigue, eyestrain, and so on, which are collectively referred to as vergence-accommodation conflict (VAC). In this case, the two eyes of the user might not verge and accommodate at the same time for estimating the relative distance of objects.

In addition, to give the user an improved FOV, a distance between the near-eye display and each of the eyes is normally kept at a limited range, for example, about 15 mm to 25 mm. However, the eyes of a user wearing eyeglasses might not be kept in the aforesaid distance range, which might adversely affect the FOV. In addition, it is cumbersome if the eyeglasses are necessary to be provided between the user and the near-eye display for viewing images.

SUMMARY

Therefore, an object of the disclosure is to provide a varifocal lens device which may be used in an optical display system (for example, a near-eye display) to eliminate or alleviate at least one of the above-mentioned drawbacks. In addition, the varifocal lens device may be used in a corrective lens assembly for daily vision correction.

According to a first aspect of the disclosure, a varifocal lens device includes a lens unit and a polarization controller. The lens unit includes a polarization-dependent lens, and has different optical powers for different polarization directions of light. The polarization controller is coupled to the lens unit, and is electrically driven to switch between a first state and a second state. When a light beam is introduced into the varifocal lens device along an optical axis in a Z direction through the polarization controller in the first state, a polarization direction of the light beam is converted by the polarization controller. When the light beam is introduced into the varifocal lens device along the optical axis through the polarization controller in the second state, the polarization direction of the light beam is prevented from being converted by the polarization controller.

According to a second aspect of the disclosure, a corrective lens assembly includes at least one varifocal lens device and a polarizer. The polarizer is configured to transmit a linearly polarized light to the at least one varifocal lens device. The polarization controller and the lens unit of the at least one varifocal lens device are disposed proximate to and distal from the polarizer, respectively.

According to a third aspect of the disclosure, an optical display system includes at least one varifocal lens device.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
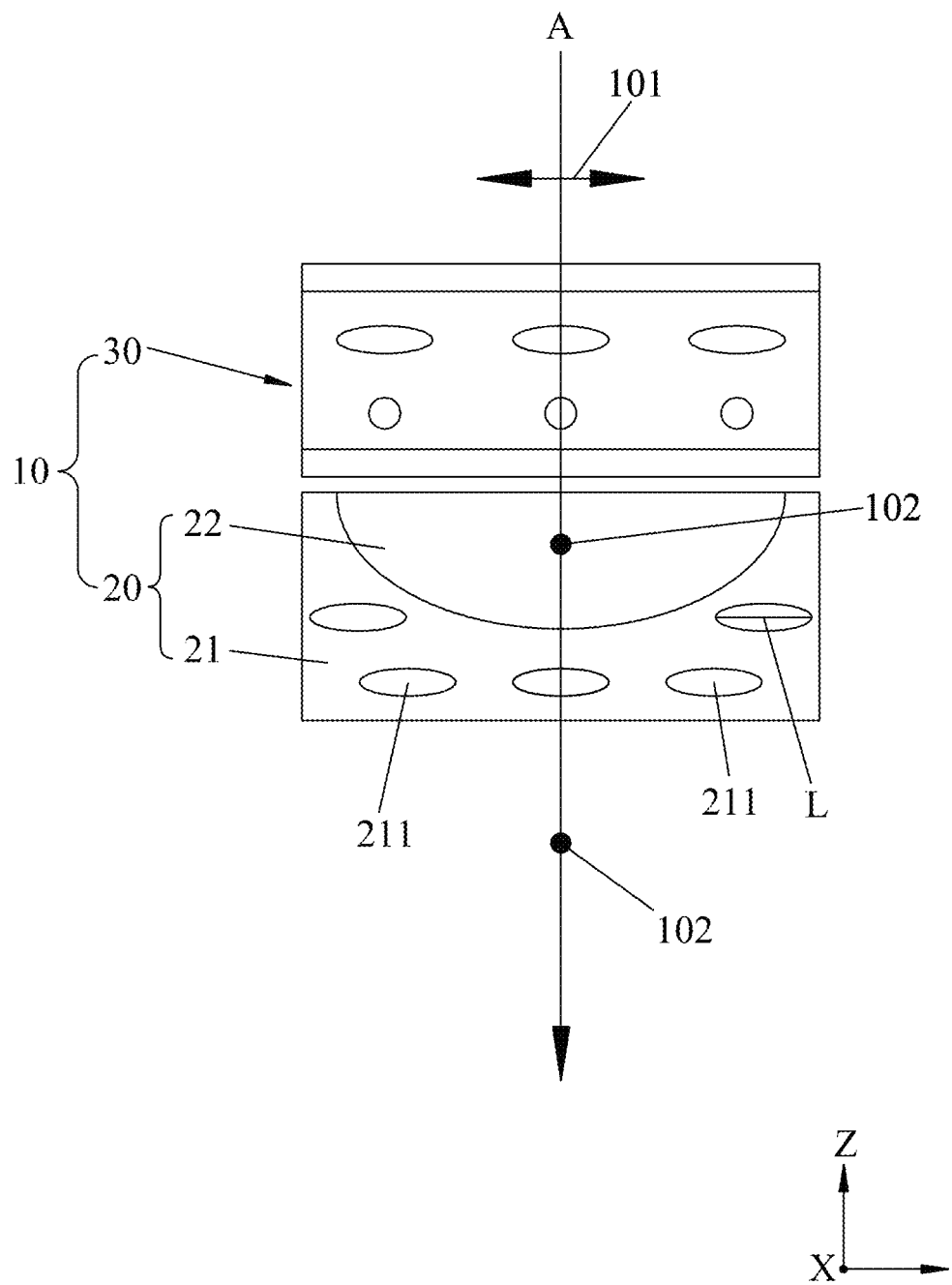
FIG. 1 is a schematic view illustrating a varifocal lens device in accordance with a first embodiment of the disclosure, in which a polarization controller is in a first state.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

It should be noted that the drawings, which are for illustrative purposes only, are not drawn to scale, and are not intended to represent the actual sizes or actual relative sizes of the components of the varifocal lens device, corrective lens assembly, and optical display system.

Figure 2:
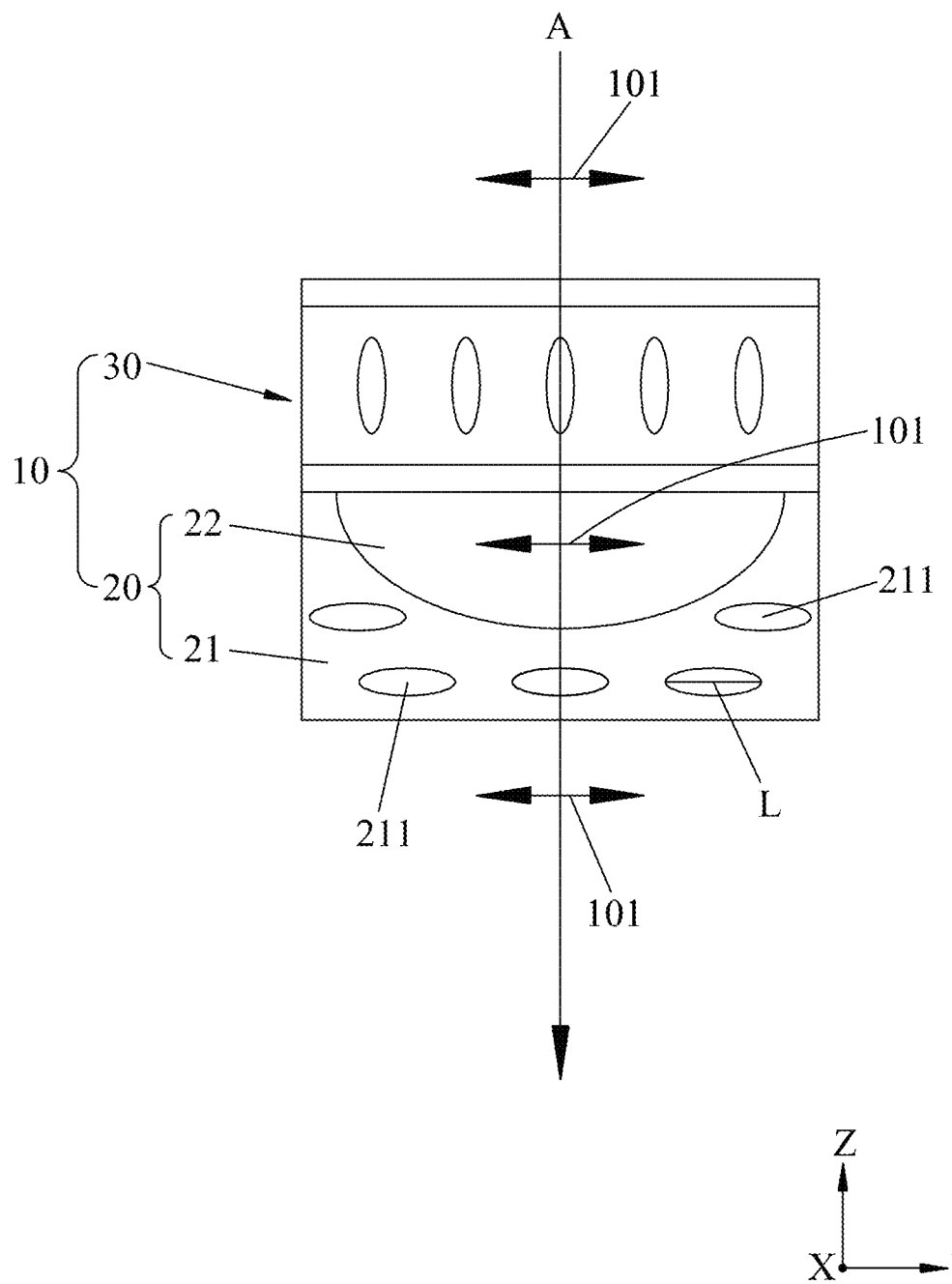
FIG. 2 is a view similar to that of FIG. 1 but illustrating the polarization controller in a second state.

Referring to FIGS. 1 and 2, a varifocal lens device 10 in accordance with a first embodiment of the disclosure is shown to include a lens unit 20 and a polarization controller 30.

The lens unit 20 includes a polarization-dependent lens 21, and has different optical powers for different polarization directions of light. In some embodiments, the lens unit 20 may further include a polarization-independent lens 22. Each of the polarization-dependent lens 21 and the polarization-independent lens 22 may have two surfaces determining its optical properties. Each of the surfaces may be a flat surface, a spherical surface, an aspherical surface, a freeform surface, a convex surface, or a concave surface.

In certain embodiments, one of the polarization-dependent lens 21 and the polarization-independent lens 22 is a plano-concave lens, and the other one of the polarization-dependent lens 21 and the polarization-independent lens 22 is a plano-convex lens. In some embodiments, as shown in FIGS. 1 and 2, the polarization-dependent lens 21 is a plano-concave lens and the polarization-independent lens 22 is a plano-convex lens.

In some embodiments, the polarization-dependent lens 21 includes liquid crystal molecules 211, and long axes (L) of the liquid crystal molecules 211 are arranged in a Y direction orthogonal to a Z direction. A light beam is introduced to pass through the varifocal lens device 10 along an optical axis (A) in the Z direction.

As shown in FIG. 1, when the light beam (i.e., an X-polarized light represented by an arrow 102) passing through the lens unit 20 is polarized in an X direction orthogonal to both the Y and Z directions, the polarization direction of the X-polarized light is orthogonal to the long axes (L) of the liquid crystal molecules 211. In this case, the X-polarized light is designated as an ordinary ray, and the lens unit 20 has a first optical power (Po).

As shown in FIG. 2, when the light beam (i.e., a Y-polarized light represented by an arrow 101) passing through the lens unit 20 is polarized in the Y direction, the polarization direction of the Y-polarized light is parallel to the long axes (L) of the liquid crystal molecules 211. In this case, the Y-polarized light is designated as an extraordinary ray, and the lens unit 20 has a second optical power (Pe) different from the first optical power (Po).

The polarization controller 30 is coupled to the lens unit 20, and is electrically driven to switch between a first state and a second state.

When the light beam is introduced into the varifocal lens device 10 along the optical axis (A) through the polarization controller 30 in the first state (see FIG. 1), a polarization direction of the light beam is converted by the polarization controller 30. For example, the Y-polarized light represented by the arrow 101 shown in FIG. 1 is converted by the polarization controller 30 into the X-polarized light represented by the arrow 102.

When the light beam is introduced into the varifocal lens device 10 along the optical axis (A) through the polarization controller 30 in the second state (see FIG. 2), the polarization direction of the light beam is prevented from being converted by the polarization controller 30. For example, the Y-polarized light represented by the arrow 101 in FIG. 2 passes through the polarization controller 30 without being converted.

In some embodiments, the polarization controller 30 may be a twisted nematic (TN) liquid crystal cell, a liquid crystal waveplate, and a combination thereof. In certain embodiments, the first polarization controller 30 is a TN liquid crystal cell which can be switched between the first state (off state) and the second state (on state) in a very short time.

Figure 3:
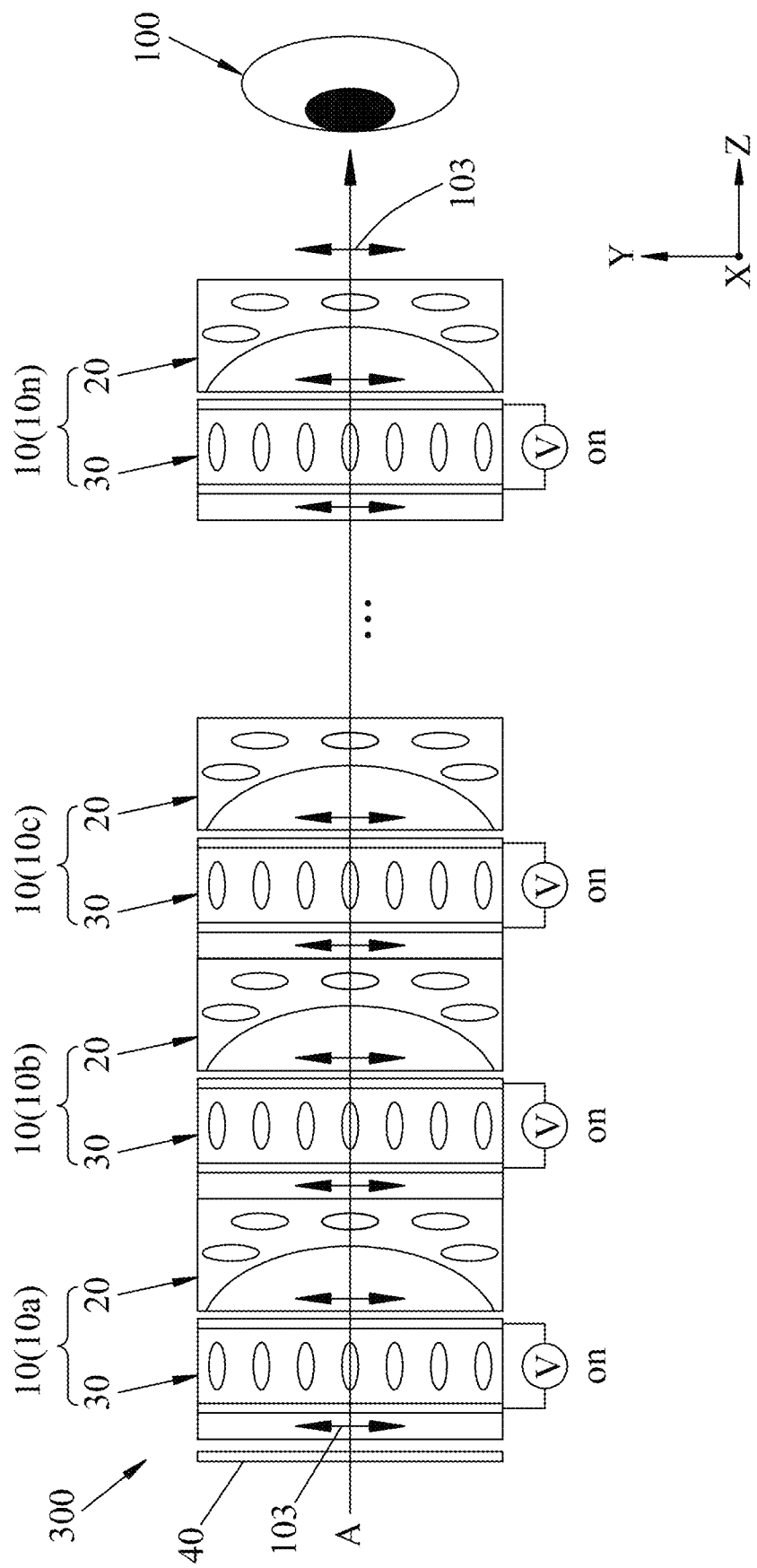
FIG. 3 is a schematic view illustrating a corrective lens assembly in accordance with a second embodiment of the disclosure.

FIG. 3 illustrates a corrective lens assembly 300 for daily vision correction in accordance with a second embodiment of the disclosure. The corrective lens assembly 300 may include at least one varifocal lens device 10 and a polarizer 40. The polarizer 40 is configured to transmit a linearly polarized light to the at least one varifocal lens device 10. The polarization controller 30 and the lens unit 20 of the at least one varifocal lens device 10 are disposed proximate to and distal from the polarizer 40, respectively.

In some embodiments, as shown in FIG. 3, the corrective lens assembly 300 includes a plurality of the varifocal lens devices 10a to 10n. In the case that all of the polarization controllers 30 of the varifocal lens device 10a to 10n are in the second state (on state) and that a Y-polarized light represented by an arrow 103 passes through all the lens units 20 of the varifocal lens devices 10a to 10n, the varifocal lens devices 10a to 10n have optical powers Pae to Pne, respectively. In this case, the corrective lens assembly 300 may have an optical power equal to a sum of Pae to Pne.

On the other hand, if the polarization controller 30 of the varifocal lens device 10a is in the first state (off state), and the polarization controllers 30 of the varifocal lens device 10b to 10n are in the second state (on state), an X-polarized light (not shown) will pass through all the lens units 20 of the varifocal lens devices 10a to 10n. In this case, the corrective lens assembly 300 may have an optical power equal to a sum of Pao to Pno. Hence, by varying the state of the polarization controllers 30 of the varifocal lens devices 10a to 10n, the corrective lens assembly 300 may have $2^n$ possibilities of changes in the optical power. Therefore, optical power of the corrective lens assembly 300 may be adjusted according to a required visual correction of an eye 100.

FIGS. 4 to 7 illustrates a corrective lens assembly 300 in accordance with a third embodiment of the disclosure. The third embodiment is similar to the second embodiment except that, in the third embodiment, the corrective lens assembly 300 includes two varifocal lens devices 10 (which are also respectively denoted by 10a, 10b). Each of the varifocal lens devices 10a, 10b includes a polarization controller 30a or 30b (corresponding to the above-mentioned polarization controller 30), and a lens unit 20a or 20b (corresponding to the above-mentioned lens unit 20).

Figure 4:
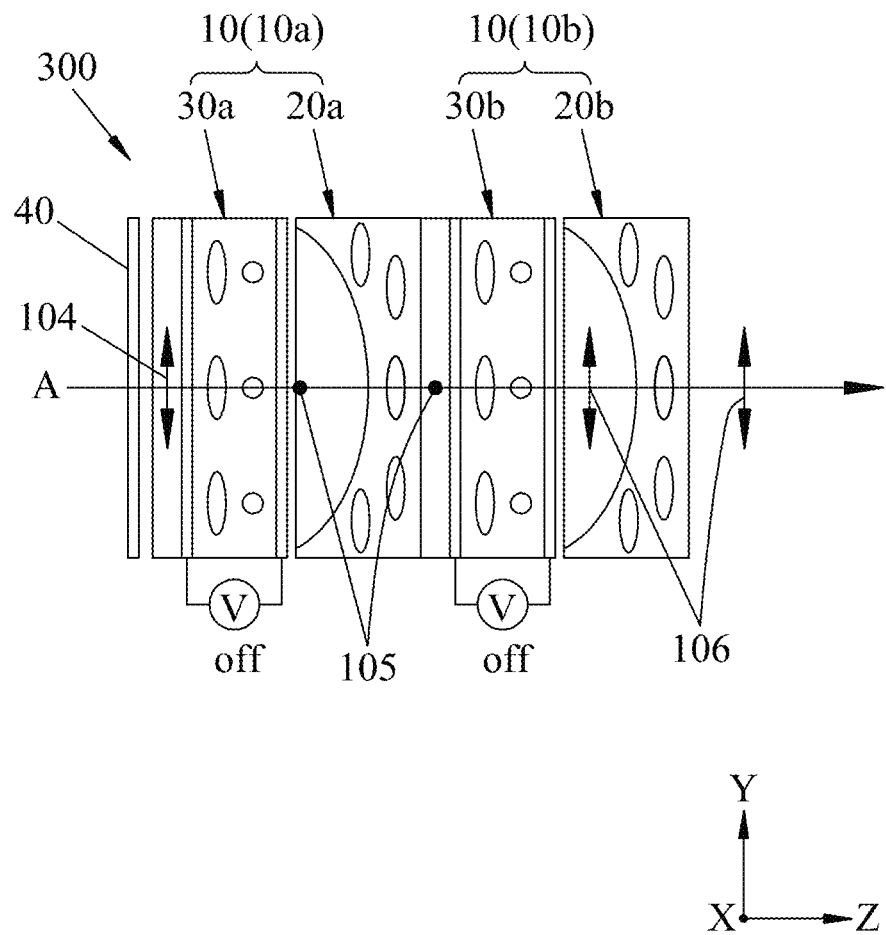
FIG. 4 is a schematic view illustrating a corrective lens assembly in accordance with a third embodiment of the disclosure.

In the case that both the polarization controllers 30a, 30b are in the first state (off state), polarization transformations of the light beam in the corrective lens assembly 300 are described with reference to FIG. 4. A Y-polarized light represented by an arrow 104 is converted by the polarization controller 30a into an X-polarized light represented by the arrow 105. Subsequently, the X-polarized light passes through the lens unit 20a, and thus the lens unit 20a has an optical power of Pao. The X-polarized light is then converted by the polarization controller 30b into a Y-polarized light represented by an arrow 106. The Y-polarized light passes through the lens unit 20b, and thus the lens unit 20b has an optical power of Pbe. Therefore, the corrective lens assembly 300 shown in FIG. 4 has an optical power equal to a sum of Pao and Pbe.

Figure 5:
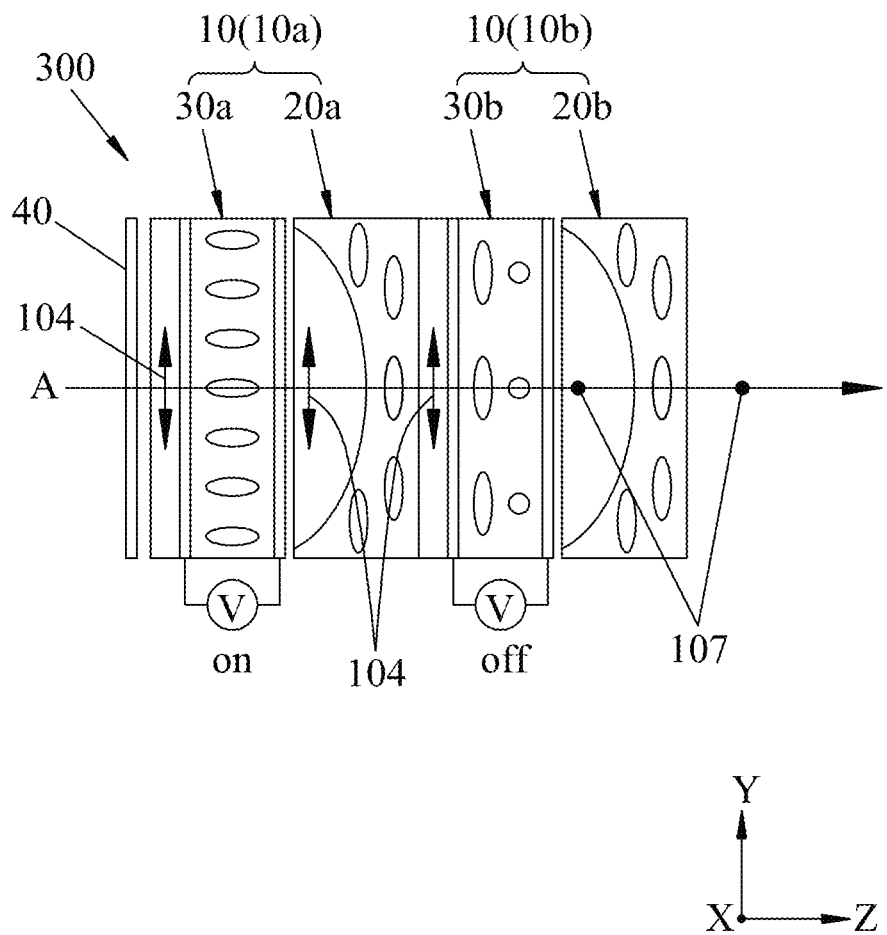
FIGS. 5 to 7 are views similar to that of FIG. 4 but illustrating the corrective lens assembly in different operation states.

In the case that the polarization controller 30a is in the second state (on state) and the polarization controller 30b in the first state (off state), polarization transformations of the light beam in the corrective lens assembly 300 are described with reference to FIG. 5. A Y-polarized light represented by the arrow 104 passes through the polarization controller 30a without being converted. Subsequently, the Y-polarized light passes through the lens unit 20a, and thus the lens unit 20a has an optical power of Pae. The Y-polarized light is then converted by the polarization controller 30b into an X-polarized light represented by an arrow 107. Thereafter, the X-polarized light passes through the lens unit 20b, and thus the lens unit 20b has an optical power of Pbo. Therefore, the corrective lens assembly 300 shown in FIG. 5 has an optical power equal to a sum of Pae and Pbo.

Figure 6:
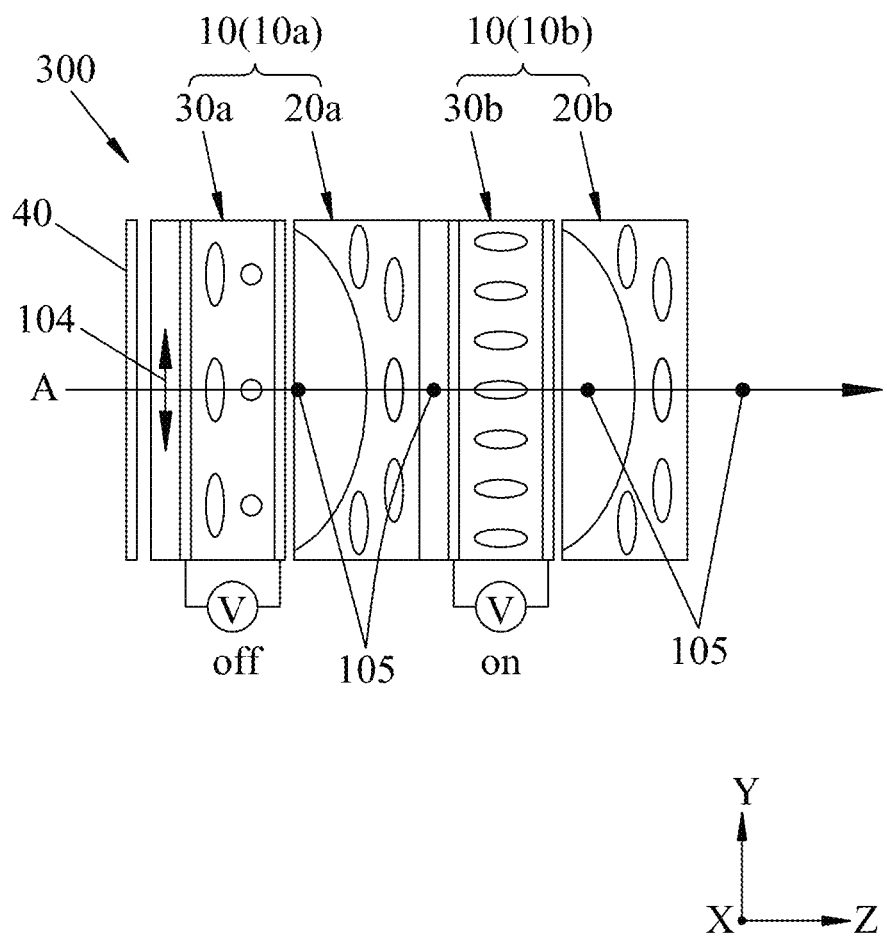

In the case that the polarization controller 30a is in the first state (off state) and the polarization controller 30b in the second state (on state), polarization transformations of the light beam in the corrective lens assembly 300 are described with reference to FIG. 6. A Y-polarized light represented by the arrow 104 is converted by the polarization controller 30a into an X-polarized light represented by the arrow 105. Subsequently, the X-polarized light passes through the lens unit 20a, and thus the lens unit 20a has an optical power of Pao. Then, the X-polarized light passes through the polarization controller 30b without being converted. Thereafter, the X-polarized light passes through the lens unit 20b, and thus the lens unit 20b has an optical power of Pbo. Therefore, the corrective lens assembly 300 shown in FIG. 6 has an optical power equal to a sum of Pao and Pbo.

Figure 7:
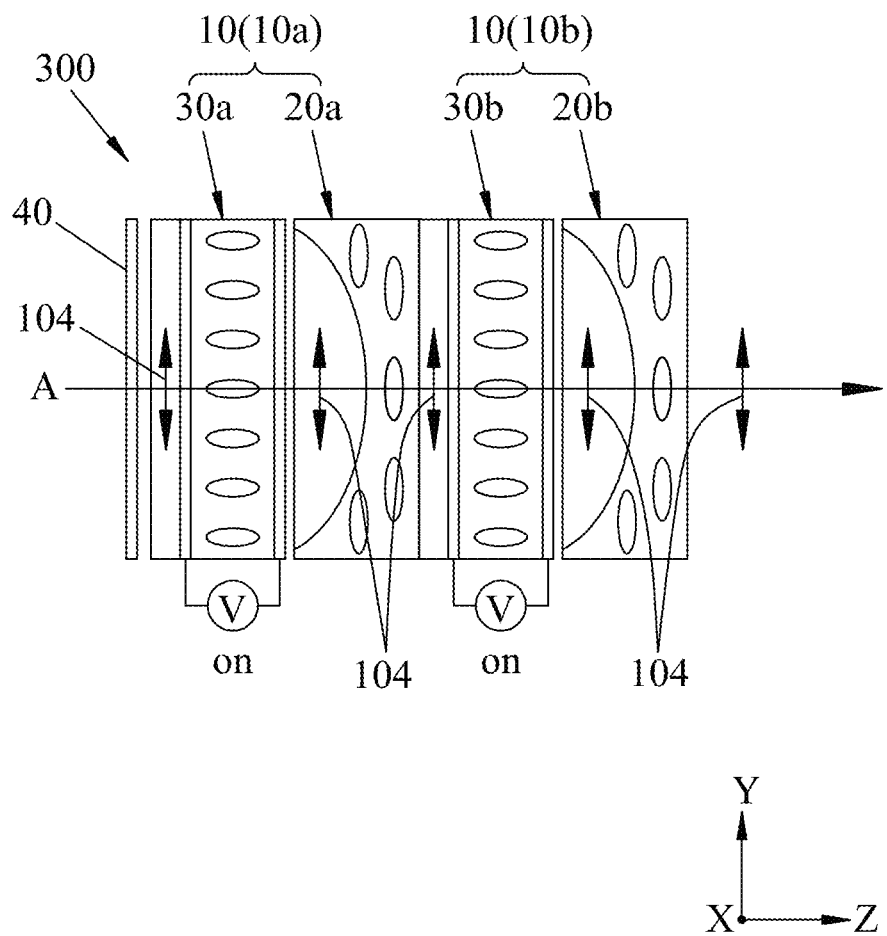

In the case that both the polarization controllers 30a, 30b are in the second state (on state), polarization transformations of the light beam in the corrective lens assembly 300 are described with reference to FIG. 7. A Y-polarized light represented by the arrow 104 passes through the polarization controller 30a without being converted. Subsequently, the Y-polarized light passes through the lens unit 20a, and thus the lens unit 20a has an optical power of Pae. Then, the Y-polarized light passes through the polarization controller 30b without being converted. Thereafter, the Y-polarized light passes through the lens unit 20b, and thus the lens unit 20b has an optical power of Pbe. Therefore, the corrective lens assembly 300 shown in FIG. 7 has an optical power equal to a sum of Pae and Pbe.

Hence, it can be appreciated that when two varifocal lens devices 10a, 10b are included in the corrective lens assembly 300, the corrective lens assembly 300 may have four possibilities of changes in the optical power.

Figure 8:
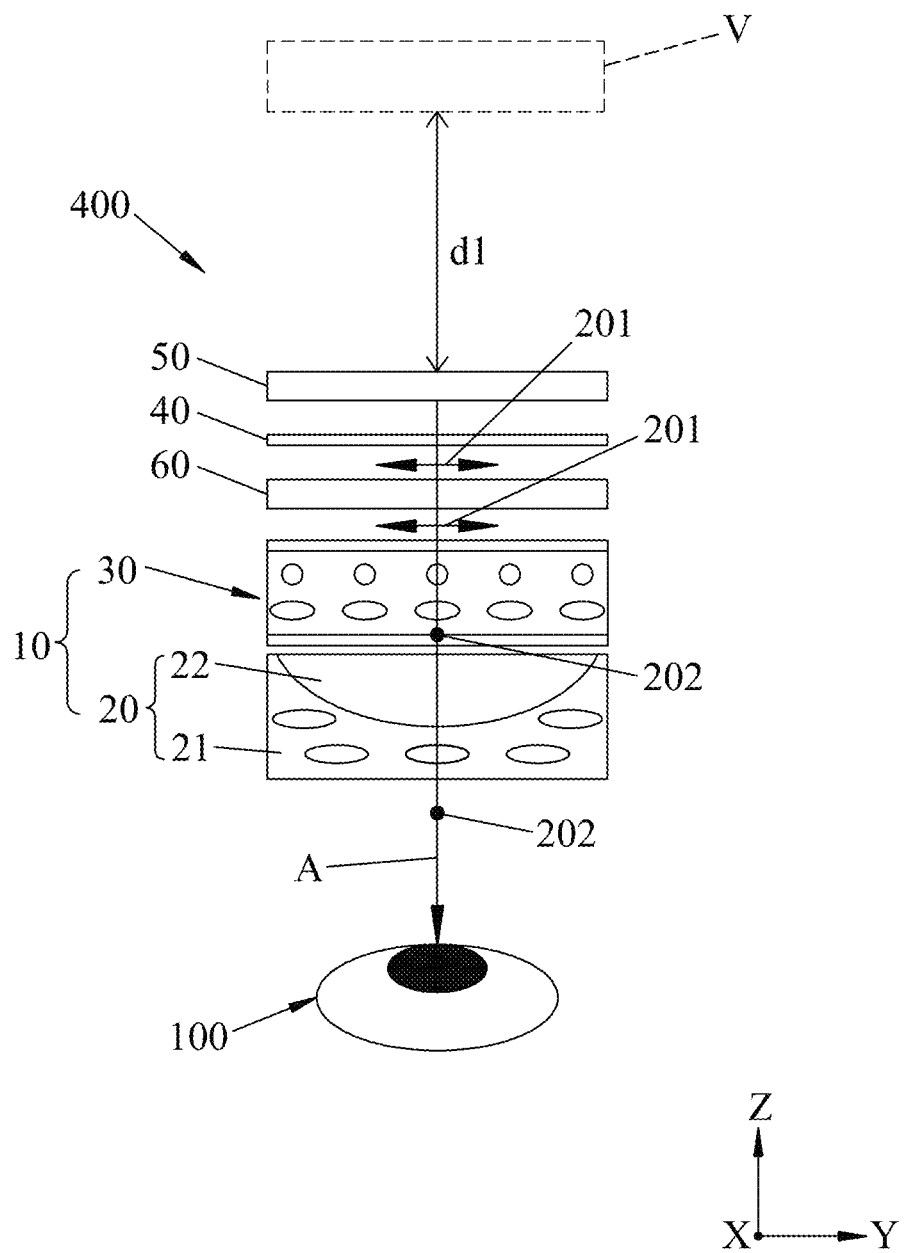
FIG. 8 is a schematic view illustrating an optical display system in accordance with a fourth embodiment of the disclosure.
Figure 9:
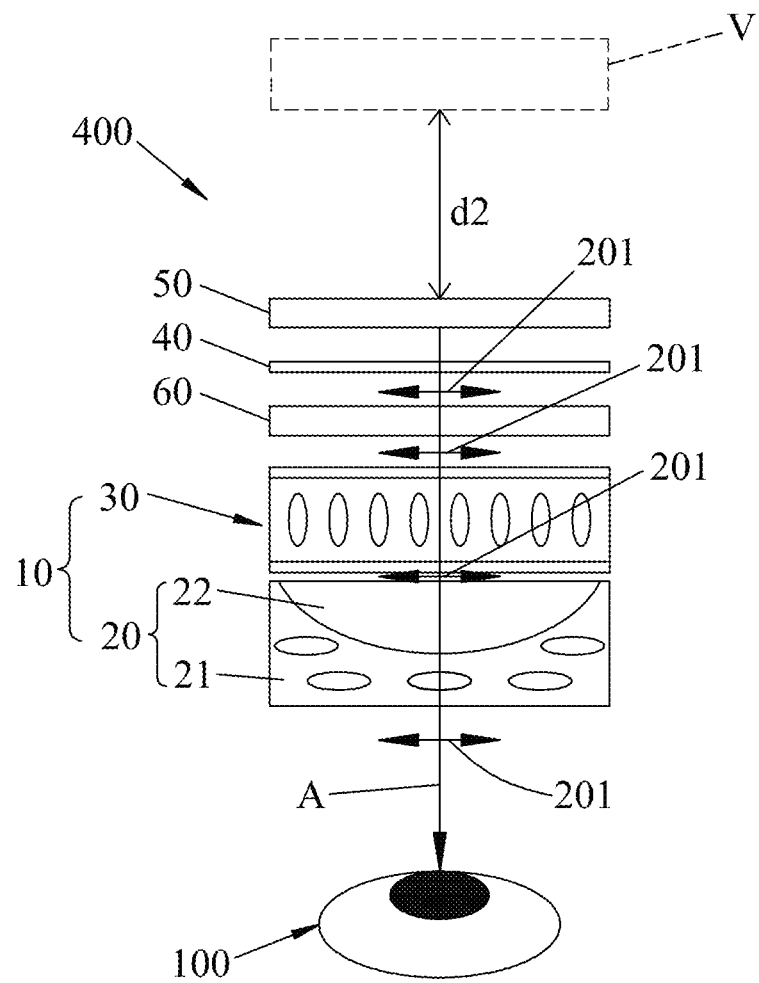
FIG. 9 is a view similar to that of FIG. 8 but illustrating the optical display system in a different operation state.

FIGS. 8 and 9 illustrate an optical display system 400 in accordance with a fourth embodiment of the disclosure. The optical display system 400 may include at least one varifocal lens device 10.

In some embodiments, as shown in FIGS. 8 and 9, the optical display system 400 includes a display 50 disposed to provide a light to pass through the at least one varifocal lens 10. The polarization controller 30 and the lens unit 20 of the at least one varifocal lens device 10 are disposed proximate to and distal from the display 50, respectively. In some embodiments, the display 50 provides a non-polarized light, and a polarizer 40 (see FIGS. 8 and 9) may be provided between the display 50 and the at least one varifocal lens 10. In some other embodiments, the display 50 is configured to provide a linearly polarized light (for example, a Y-polarized light represented by an arrow 201), and the polarizer 40 may not be provided.

In some embodiments, as shown in FIGS. 8 and 9, the optical display system 400 further includes a fixed focal lens 60 disposed downstream of the display 50 so as to permit the light from the display 50 to be transmitted to a viewer (represented by an eye 100) through the fixed focal lens 60 and the at least one varifocal lens device 10, thereby forming a virtual image (V). In some embodiments, the fixed focal lens 60 may be disposed between the at least one varifocal lens device 10 and the display 50. In some other embodiments, the fixed focal lens 60 may be disposed between the at least one varifocal lens device 10 and the viewer. The fixed focal lens 60 may be any optical lens with a desired focal length.

In the case that the polarization controller 30 is in the first state, the polarization transformations of the light in the optical display system 400 is described below with reference to FIG. 8. A Y-polarized light represented by the arrow 201 provided from the display 50 passes through the fixed focal lens 60, and is then converted by the polarization controller 30 into an X-polarized light represented by an arrow 202. The X polarized light passes through the lens unit 20, and thus the lens unit 20 has an optical power of Po.

Thereafter, the X-polarized light travels toward the viewer's eye 100. In this case, the virtual image (V) is formed at a first distance (d1) behind the display 50.

In the case that the polarization controller 30 is in the second state, the polarization transformations of the light in the optical display system 400 is described below with reference to FIG. 9. A Y-polarized light represented by the arrow 201 provided from the display 50 passes through the fixed focal lens 60, and then passes through the polarization controller 30 without being converted. The Y polarized light passes through the lens unit 20, and thus the lens unit 20 has an optical power of Pe. Thereafter, the Y-polarized light travels toward the viewer's eye 100. In this case, the virtual image (V) is formed at a second distance (d2) behind the display 50, and the second distance (d2) is smaller than the first distance (d1).

Therefore, by varying the state of the polarization controller 30 of the varifocal lens device 10, the location of virtual image (V) can be shifted accordingly.

In some embodiments, as shown in FIGS. 8 and 9, the optical display system 400 may serve as a portion of a near-eye display for a virtual reality (VR) system (not shown).

With the provision of the optical display system 400, the virtual image (V) can be shifted by switching the polarization controller 30 of the varifocal lens device 10. In addition, the optical display system 400 of the disclosure may be useful for mitigating the vergence-accommodation conflict (VAC) caused by the near-eye display, and/or for vision correction in the near-eye display.

FIGS. 10 to 13 illustrate an optical display system 400 in accordance with a fifth embodiment of the disclosure. The fifth embodiment is similar to the fourth embodiment except that in the fifth embodiment, the optical display system 400 includes three varifocal lens devices 10 (which are also respectively denoted by 10a, 10b, 10c). Each of the varifocal lens devices 10a, 10b, 10c includes a polarization controller 30a, 30b or 30c (corresponding to the above-mentioned polarization controller 30), and a lens unit 20a, 20b or 20c (corresponding to the above-mentioned lens unit 20).

Figure 10:
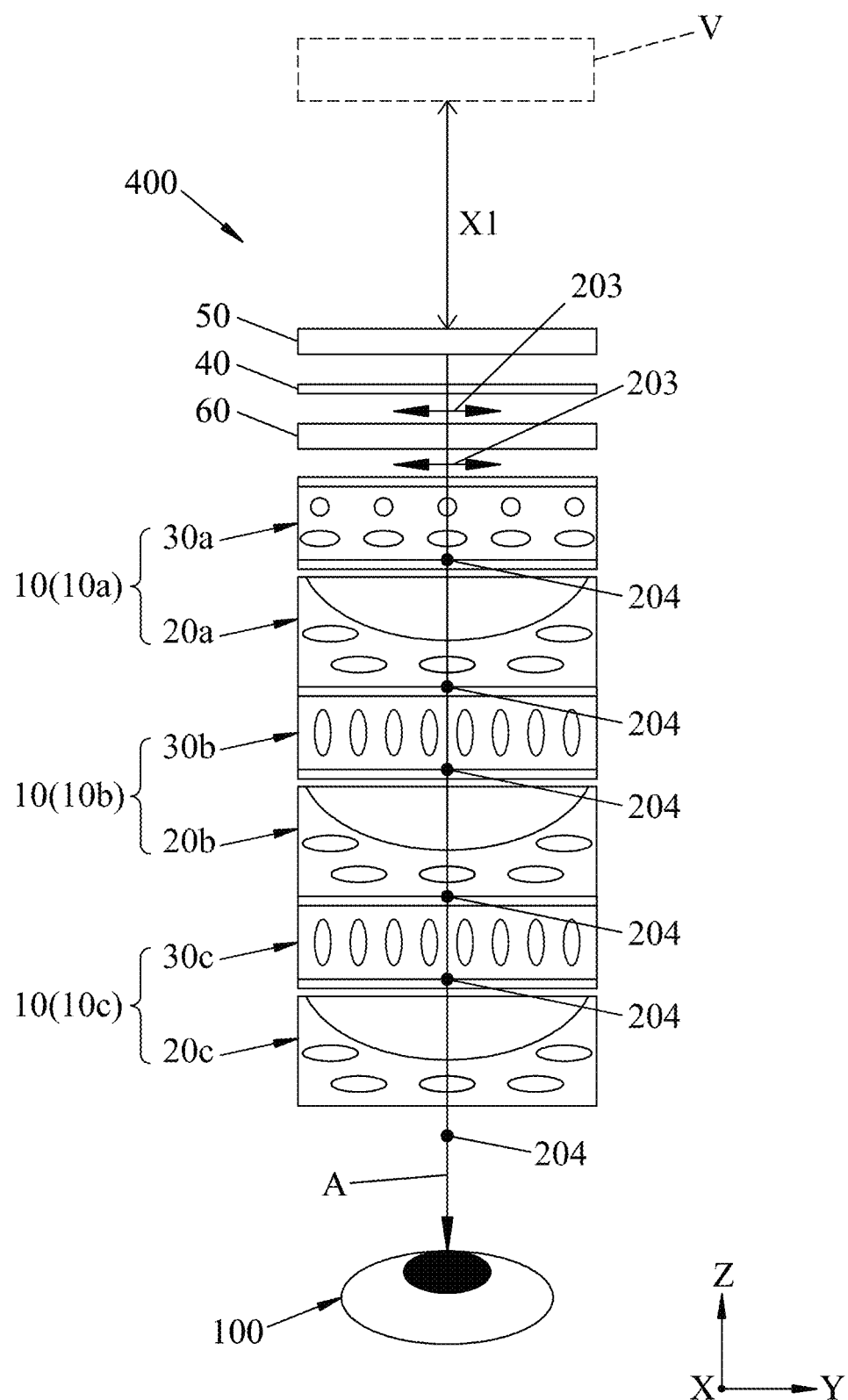
FIG. 10 is a schematic view illustrating an optical display system in accordance with a fifth embodiment of the disclosure.

In FIG. 10, the polarization controller 30a is in the first state, and the polarization controllers 30b, 30c are in the second state. After a Y-polarized light represented by an arrow 203 from the display 50 passes through the fixed focal lens 60, the Y-polarized light is converted by the polarization controller 30a into an X-polarized light represented by an arrow 204. Then, the X-polarized light sequentially passes through the lens unit 20a, the polarization controller 30b, the lens unit 20b, the polarization controller 30c, and the lens unit 20c, and finally travels toward the viewer's eye 100. Therefore, the varifocal lens devices 10a to 10c shown in FIG. 10 have an optical power equal to a sum of Pao, Pbo and Pco. In some embodiments, a virtual image (V) is formed at an X1 distance behind the display 50. In an example, the X1 distance is about 480 cm.

Figure 11:
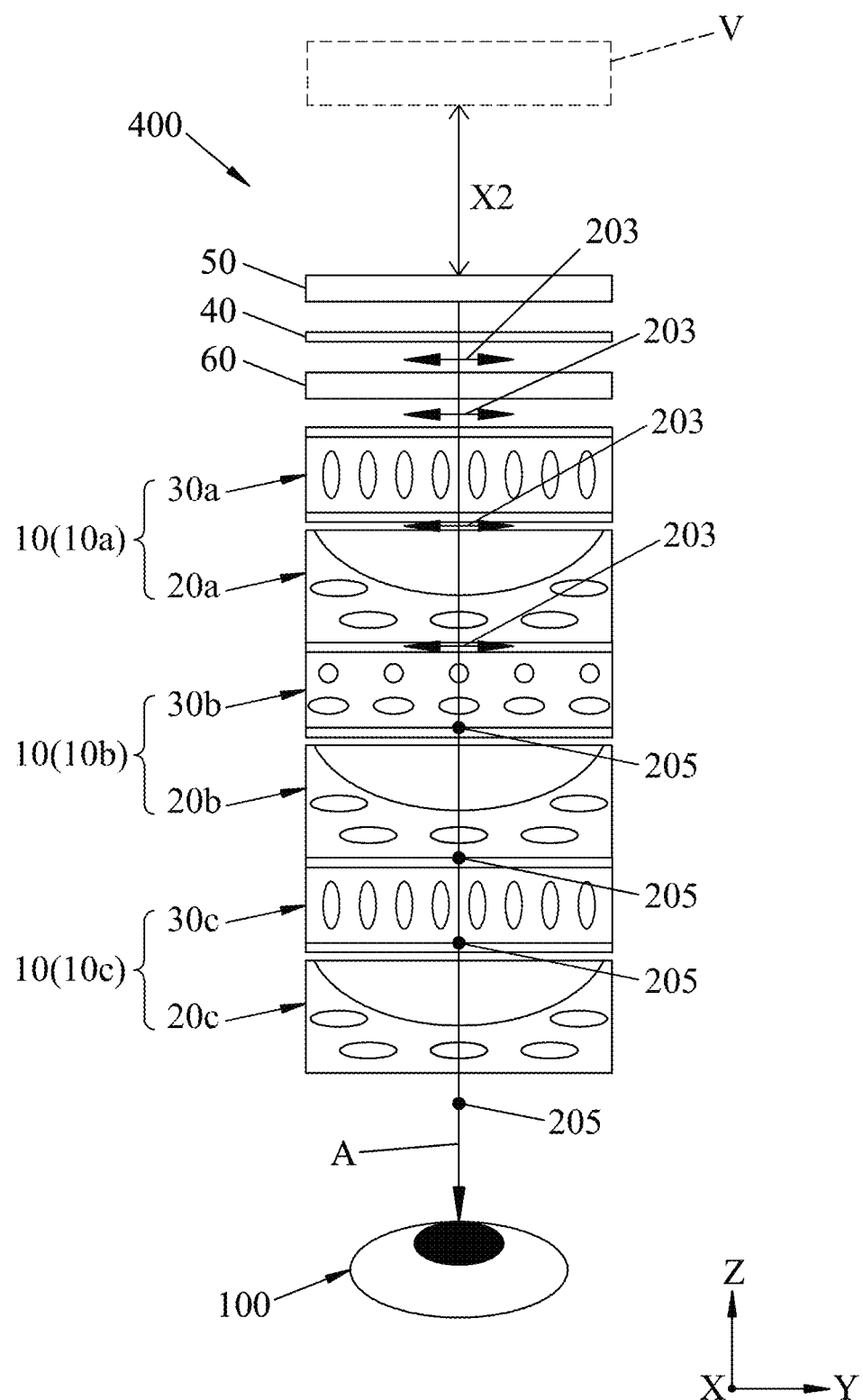
FIGS. 11 to 13 are views similar to that of FIG. 10 but illustrating the optical display system in different operation states.

In FIG. 11, the polarization controllers 30a, 30c are in the second state, and the polarization controller 30b is in the first state. After a Y-polarized light represented by the arrow 203 from the display 50 passes through the fixed focal lens 60, the polarization controller 30a and the lens unit 20a, the Y-polarized light is converted by the polarization controller 30b into an X-polarized light represented by an arrow 205. Then, the X-polarized light sequentially passes through the lens unit 20b, the polarization controller 30c, and the lens unit 20c, and finally travels toward the viewer's eye 100. Therefore, the varifocal lens devices 10a to 10c shown in FIG. 11 have an optical power equal to a sum of Pae, Pbo and Pco. In some embodiments, a virtual image (V) is formed at an X2 distance behind the display 50, and the X2 distance is smaller than the X1 distance. In an example, the X2 distance is about 73 cm.

Figure 12:
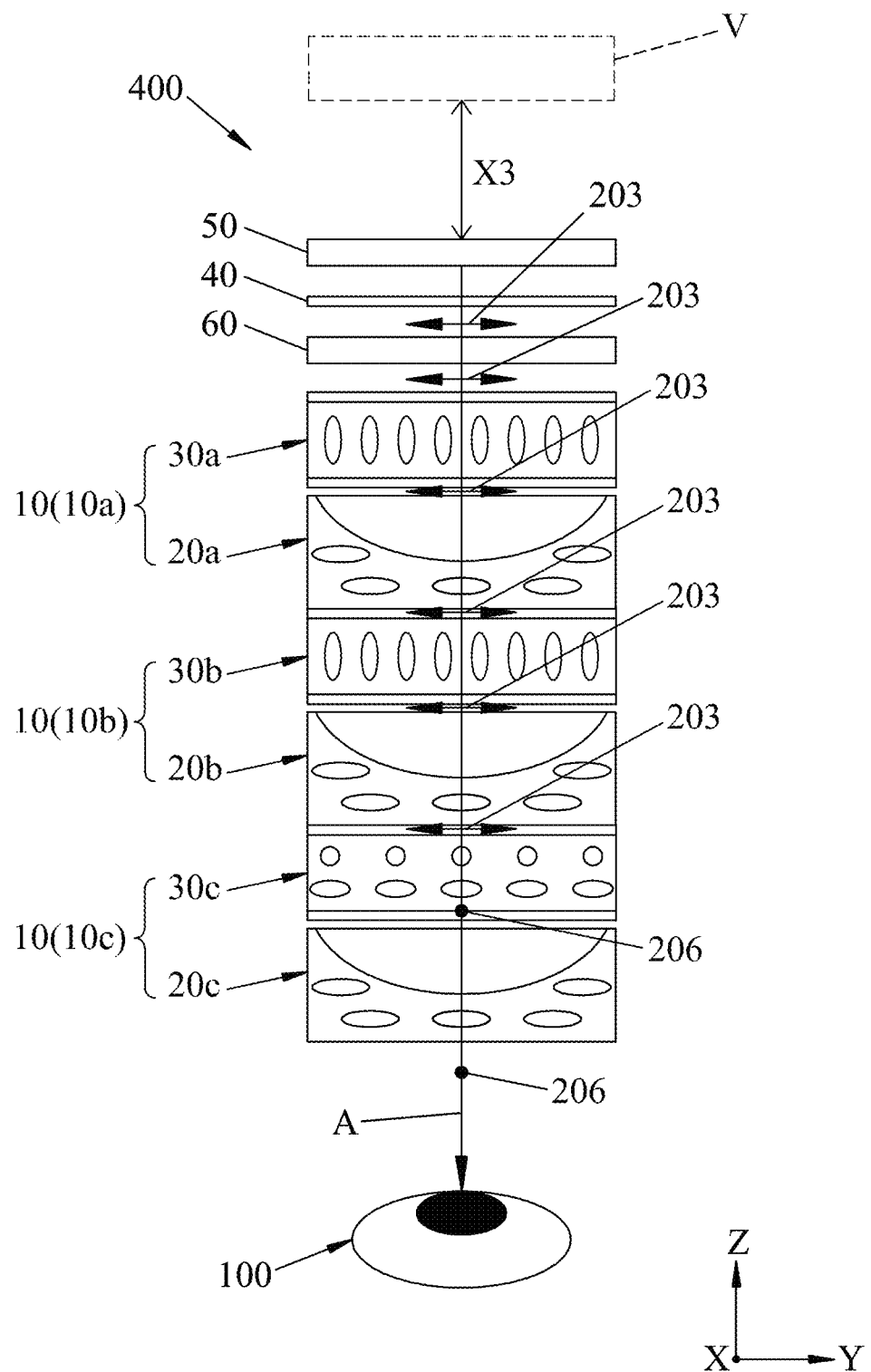

In FIG. 12, the polarization controllers 30a, 30b are in the second state, and the polarization controller 30c is in the first state. After a Y-polarized light represented by the arrow 203 from the display 50 sequentially passes through the fixed focal lens 60, the polarization controller 30a, the lens unit 20a, the polarization controller 30b and the lens unit 20b, the Y-polarized light is converted by the polarization controller 30c into an X-polarized light represented by an arrow 206. Then, the X-polarized light passes through the lens unit 20c, and finally travels toward the viewer's eye 100. Therefore, the varifocal lens devices 10a to 10c shown in FIG. 12 have an optical power equal to a sum of Pae, Pbe and Pco. In some embodiments, a virtual image (V) is formed at an X3 distance behind the display 50, and the X3 distance is smaller than the X2 distance. In an example, the X3 distance is about 35 cm.

Figure 13:
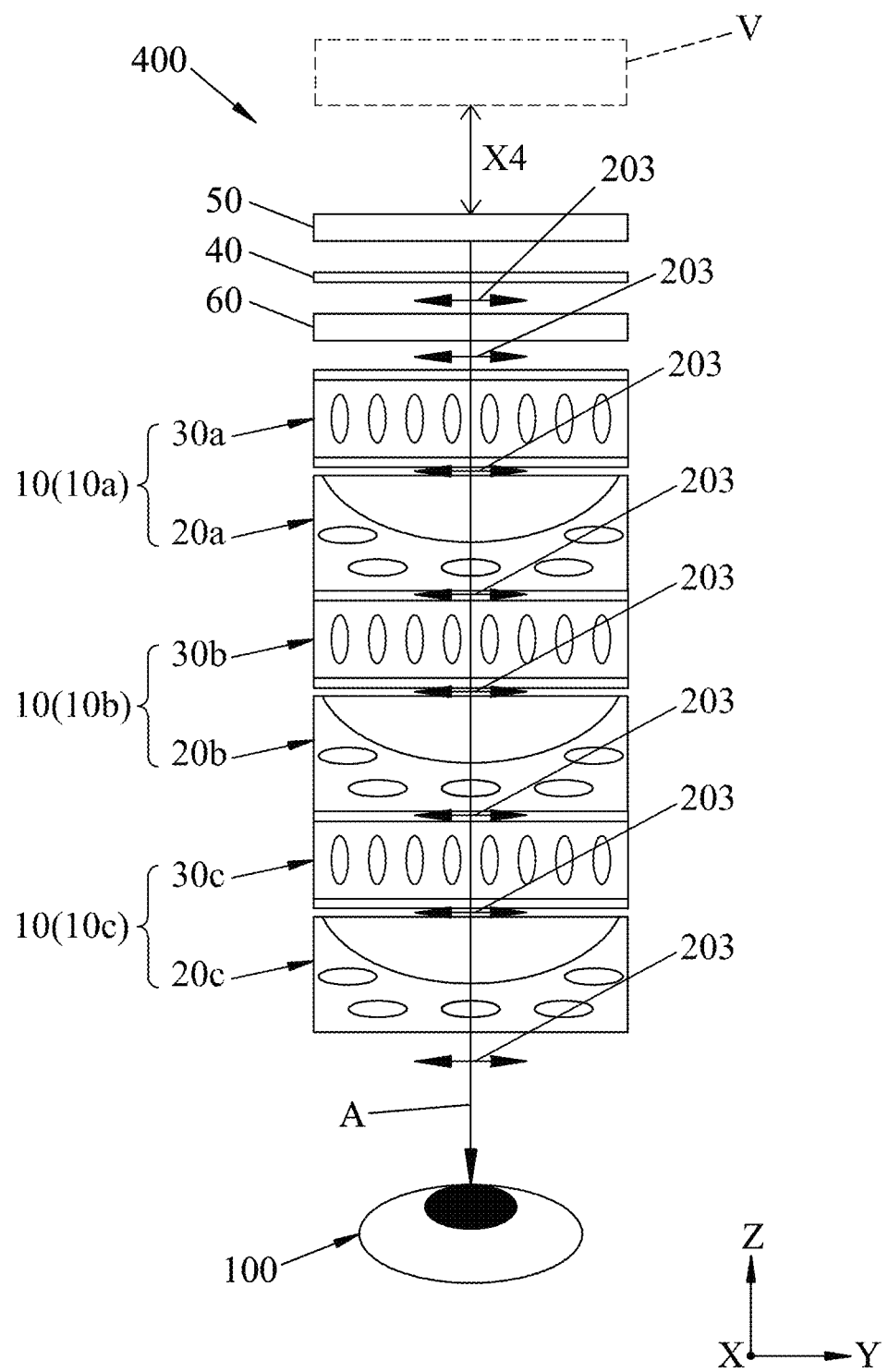

In FIG. 13, the polarization controllers 30a, 30b and 30c are in the second state. A Y-polarized light represented by the arrow 203 from the display 50 sequentially passes through the fixed focal lens 60, the polarization controller 30a, the lens unit 20a, the polarization controller 30b, the lens unit 20b, the polarization controller 30c and the lens unit 20c, and finally travels toward the viewer's eye 100. Therefore, the varifocal lens devices 10a to 10c shown in FIG. 13 have an optical power equal to a sum of Pae, Pbe and Pce. In some embodiments, a virtual image (V) is formed at an X4 distance behind the display 50, and the X4 distance is smaller than the X3 distance. In an example, the X4 distance is about 21 cm.

Figure 14:
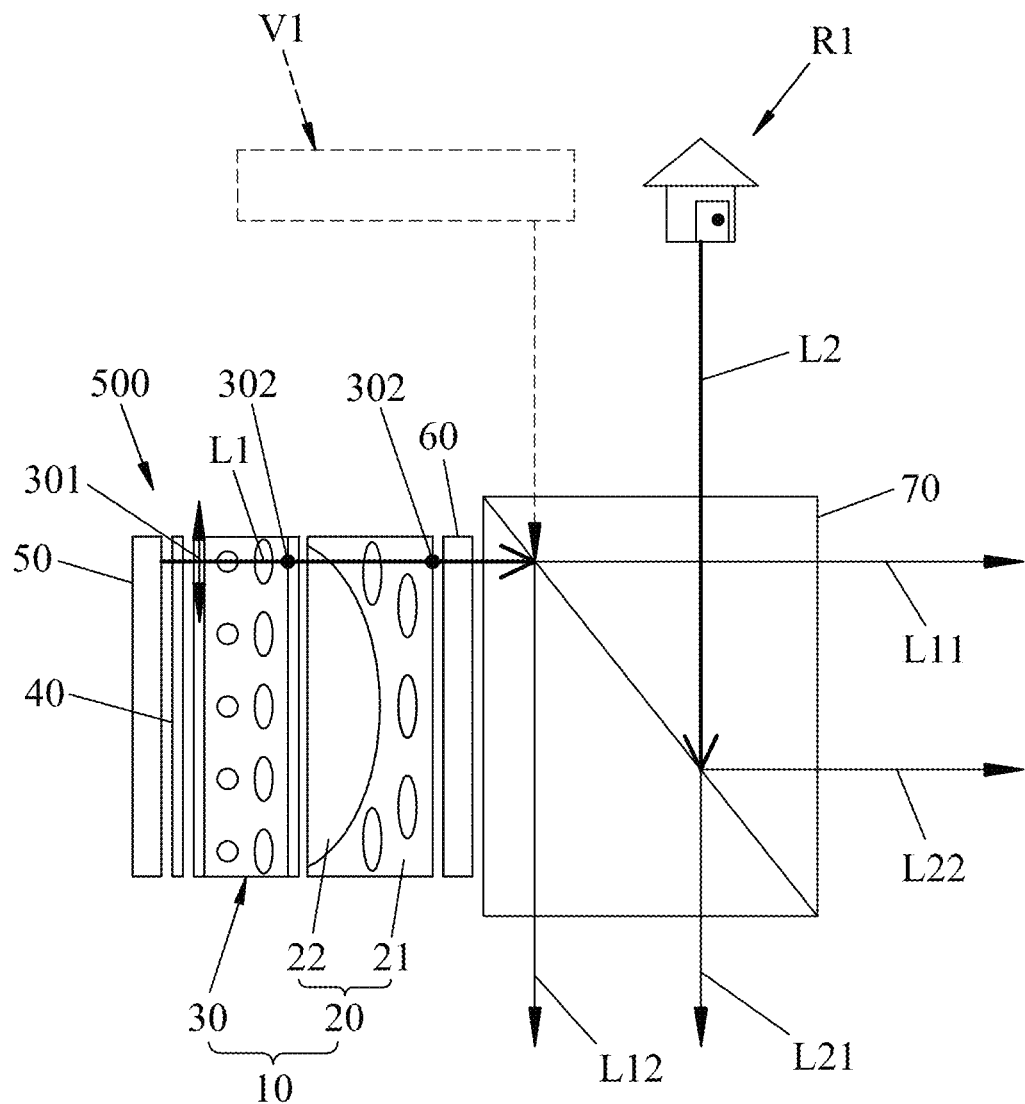
FIG. 14 is a schematic view illustrating an optical display system in accordance with a sixth embodiment of the disclosure.
Figure 15:
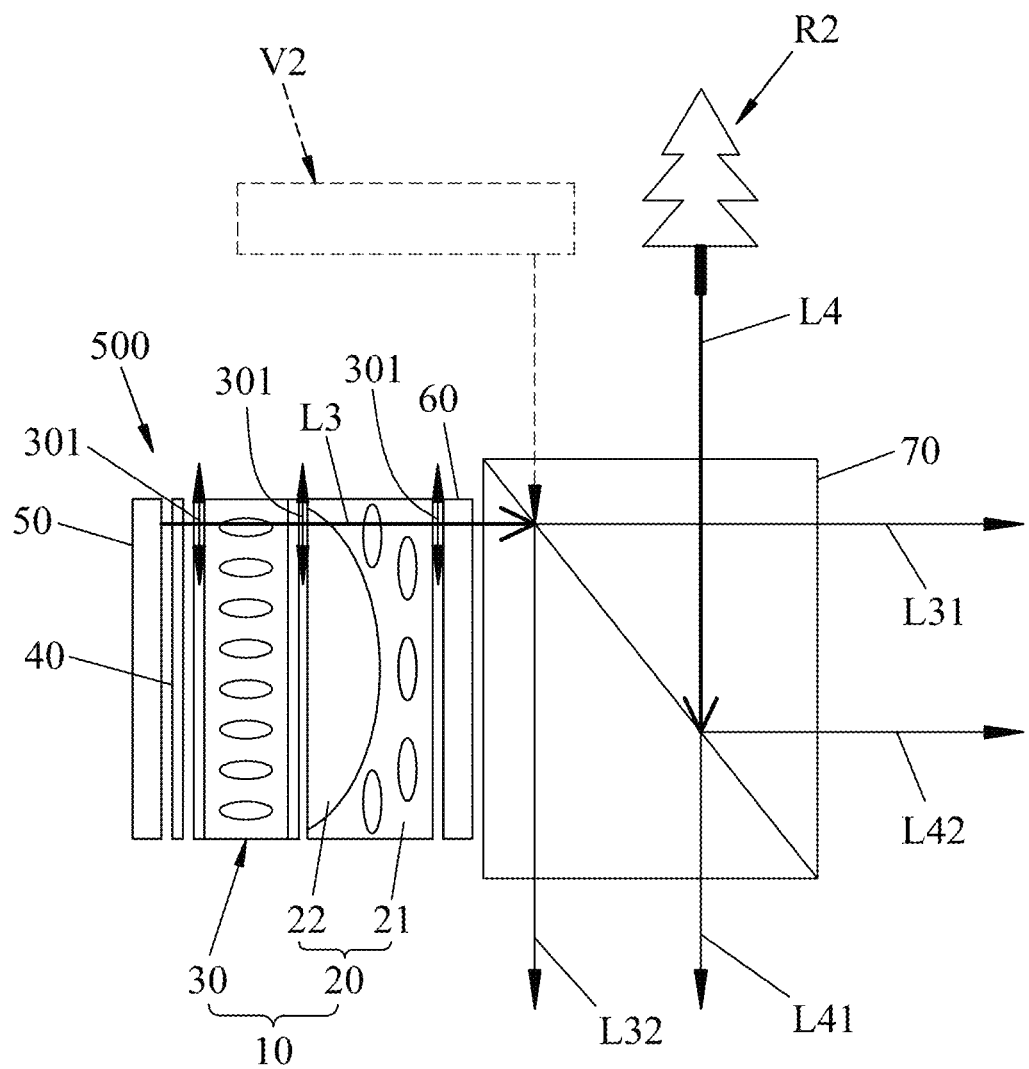
FIG. 15 is a view similar to that of FIG. 14 but illustrating the optical display system in a different operation state.

FIGS. 14 and 15 illustrate an optical display system 500 in accordance with a sixth embodiment of the disclosure. The optical display system 500 is similar to the optical display system 400 of the fourth embodiment, except that the optical display system 500 includes a beam splitter 70 disposed to combine a light from a real world object and the light from the display 50 and outputted from the at least one varifocal lens 10, and may serve as a portion of a near-eye display for an augmented reality (AR) system (not shown). In some embodiments, the beam splitter 70 is a polarization-independent beam splitter, and is configured to reflect about 50% of a light incident thereon and to transmit about 50% of the light.

In some embodiments, as shown in FIGS. 14 and 15, the beam splitter 70 is disposed to partially transmit the light from the real world object from a front side of the beam splitter 70, and the display 50 is disposed at one of left and right sides of the beam splitter 70.

In some embodiments, as shown in FIGS. 14 and 15, the at least one varifocal lens device 10 is disposed between the beam splitter 70 and the display 50.

The fixed focal lens 60 is disposed to permit the light from the display 50 to be directed toward the beam splitter 70 through the at least one varifocal lens device 10 and the fixed focal lens 60. In some embodiments, as shown in FIGS. 14 and 15, the fixed focal lens 60 is disposed between the at least one varifocal lens device 10 and the beam splitter 70. In some other embodiments, the fixed focal lens 60 may be disposed between the at least one varifocal lens device 10 and the display 50. Similarly, when the display 50 provides a non-polarized light, the polarizer 40 (see FIGS. 14 and 15) may be provided between the display 50 and the at least one varifocal lens 10. When the display 50 provides a linearly polarized light (for example, a Y-polarized light represented by an arrow 301), and the polarizer 40 may not be provided.

FIG. 14 also shows a trace of a light path (L1) for forming a virtual image (V1) and a light path (L2) for forming a real world image. A real world object (R1) is located distal from the optical display system 500. When a Y-polarized light represented by an arrow 301 provided by the display 50 travels along the light path (L1) and encounters the polarization controller 30 in the first state, the Y-polarized light is converted into an X-polarized light represented by an arrow 302. Then, the X-polarized light passes through the lens unit 20, and thus the lens unit 20 has an optical power (Po). After the X-polarized light on the light path (L1) passes through the fixed focus lens 60, the X-polarized light is split by the beam splitter 70 to travel on two branch paths (L11, L12). That is to say, about 50% of the X-polarized light passes through the beam splitter 70 to travel along the branch path (L11), and about 50% of the X-polarized light is reflected by the beam splitter 70 to travel along the branch path (L12) toward the viewer's eye 100. The X-polarized light on the branch path (L12) forms the virtual image (V1) adjacent to the real world object (R1).

In addition, a light from the real world object (R1) travels along the light path (L2) and encounters the beam splitter 70. About 50% of the light on the light path (L2) passes through the beam splitter 70 along a branch path (L21) to travel toward the viewer's eye 100, and about 50% of the light on the light path (L2) is reflected by the beam splitter 70 to travel along the branch path (L22). The light on the branch path (L21) forms the real world image. FIG. 15 also shows a trace of a light path (L3) for forming a virtual image (V2) and a light path (L4) for forming a real world image. In comparison with the real world object (R1) shown in FIG. 14, a real world object (R2) is located proximate to the optical display system 500. When a Y-polarized light represented by the arrow 301 provided by the display 50 travels along the light path (L3) and encounters the polarization controller 30 in the second state, the Y-polarized light is prevented from being converted. Then, the Y-polarized light passes through the lens unit 20, and thus the lens unit 20 has an optical power (Pe). After the Y-polarized light on the light path (L3) passes through the fixed focus lens 60, the Y-polarized light is split by the beam splitter 70 to travel on two branch paths (L31, L32). That is to say, about 50% of the Y-polarized light passes through the beam splitter 70 to travel along the branch path (L31), and about 50% of the Y-polarized light is reflected by the beam splitter 70 to travel along the branch path (L32) toward the viewer's eye 100. The Y-polarized light on the branch path (L32) forms the virtual image (V2) adjacent to the real world object (R2).

In addition, a light from the real world object (R2) travels along the light path (L4) and encounters the beam splitter 70. About 50% of the light on the light path (L4) passes through the beam splitter 70 along a branch path (L41) to travel toward the viewer's eye 100, and about 50% of the light on the light path (L4) is reflected by the beam splitter 70 to travel along the branch path (L42). The light on the branch path (L41) forms the real world image.

Hence, it can be appreciated that by adjusting the state of the polarization controller 30, the position of the virtual image can be shifted accordingly. In alternative embodiments (not shown), the optical display system 500 may include a plurality of the varifocal lens devices 10, and thus the virtual image can be shifted to a desired location away from the viewer by switching the states of the polarization controllers 30 of the varifocal lens devices 10. In addition, the optical display system 500 of the disclosure may be useful for mitigating the vergence-accommodation conflict (VAC) caused by the near-eye display.

Figure 16:
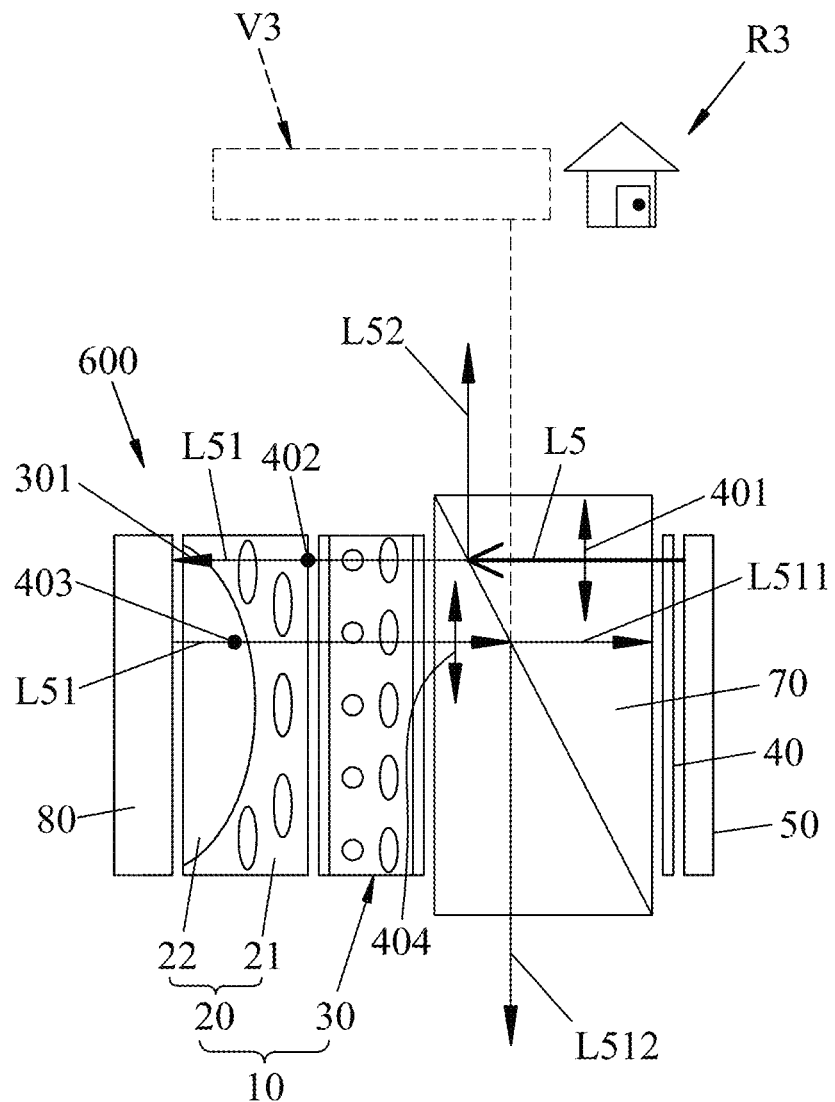
FIG. 16 is a schematic view illustrating an optical display system in accordance with a seventh embodiment of the disclosure, in which a light path for forming a virtual image is shown.
Figure 17:
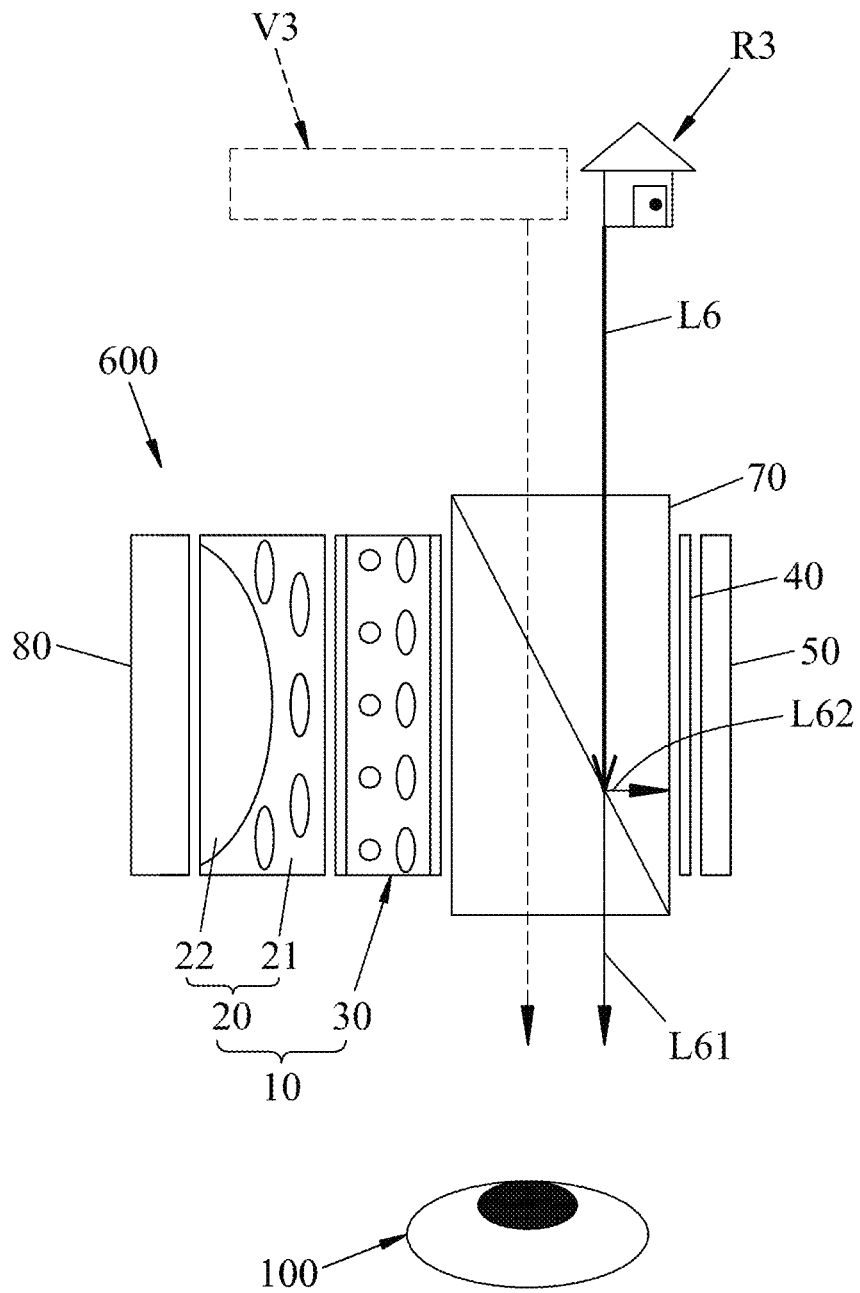
FIG. 17 is a view similar to that of FIG. 16 but illustrating a light path for forming a real world image.

FIGS. 16 and 17 illustrate an optical display system 600 in accordance with a seventh embodiment of the disclosure. The seventh embodiment is similar to the sixth embodiment except for the relative location of elements between the varifocal lens device 10 and the display 50. In addition, the beam splitter 70 is disposed between the at least one varifocal lens device 10 and the display 50. The optical display system 600 does not include the fixed focal lens 60 shown in FIGS. 14 and 15, but includes a fixed focus mirror 80 which is disposed outside of the at least one varifocal lens device 10 so as to permit the light from the display 50 and passing through the beam splitter 70 and the least one varifocal lens device 10 to be reflected by the fixed focus mirror 80 back to the beam splitter 70. In some embodiments, the fixed focus mirror 80 may be any reflective curved mirror with a desired focal length.

In some embodiments, the display 50 provides a non-polarized light, a polarizer 40 (see FIGS. 16 and 17) may be provided between the display 50 and the at least one varifocal lens 10 (for example, disposed between the display 50 and the beam splitter 70 or between the beam splitter 70 and the at least one varifocal lens 10). In some other embodiments, the display 50 is configured to provide a linearly polarized light (for example, a Y-polarized light represented by an arrow 401), and the polarizer 40 may not be provided.

In FIG. 16, the polarization controller 30 is in the first state, and a light path (L5) for forming a virtual image (V3) is traced. The display 50 is disposed to provide a Y-polarized light represented by an arrow 401 and traveling on the light path (L5). The Y-polarized light is introduced into the beam splitter 70, and splits to travel on two branch paths (L51, L52). That is, about 50% of the Y-polarized light passes through the beam splitter 70 to travel along the branch path (L51), and about 50% of the Y-polarized light is reflected by the beam splitter 70 to travel along the branch path (L52) away from the viewer's eye 100. The Y-polarized light on the branch path (L51) is then converted by the polarization controller 30 into an X-polarized light represented by an arrow 402. Thereafter, the X-polarized light on the branch path (L51) passes through the lens unit 20 and is reflected by the fixed focus mirror 80. Next, the reflected X-polarized light represented by an arrow 403 on the branch path (51) passes through the lens unit 20 again, and is then converted by the polarization controller 30 back into a Y-polarized light represented by an arrow 404. Afterward, the Y-polarized light on the branch path (51) is split by the beam splitter 70 to travel on two sub-branch paths (L511, L512). That is, about 50% of the Y-polarized light passes through the beam splitter 70 to travel along the sub-branch path (L511), and about 50% of the Y-polarized light is reflected by the beam splitter 70 to travel along the sub-branch path (L512) toward the viewer's eye 100. The Y-polarized light on the sub-branch path (L512) forms the virtual image (V3) adjacent to the real world object (R3). In this case, the light for forming the virtual image (V3) can pass through the lens unit 20 for two times (i.e., the light can be modulated by the lens unit 20 for two times). As such, the optical display system 600 may have an optical power double to that of the optical display system 500. That is, when the polarization controllers 30 in both of the optical display systems 500, 600 are in the second state, the virtual image formed by the optical display system 600 can be closer to the viewer's eye 100 compared with the virtual image formed by the optical display system 500.

FIG. 17 also shows a trace of a light path (L6) for forming a real world image. A light from a real world object (R3) travels along the light path (L6) and encounters the beam splitter 70. About 50% of the light on the light path (L6) passes through the beam splitter 70 along a branch path (L61) to travel toward the viewer's eye 100, and about 50% of the light on the light path (L6) is reflected by the beam splitter 70 to travel along the branch path (L62). The light on the branch path (L61) forms the real world image.

In addition, it can be appreciated that by adjusting the state of the polarization controller 30, the position of the virtual image can be varied accordingly. In alternative embodiments (not shown), the optical display system 600 may include a plurality of the varifocal lens devices 10, and the virtual image may be formed at more possible positions by adjusting polarization controllers 30 of the varifocal lens devices 10. Of course, the optical display system 600 may be also useful for mitigating the vergence-accommodation conflict (VAC) caused by a near-eye display (not shown).

Figure 18:
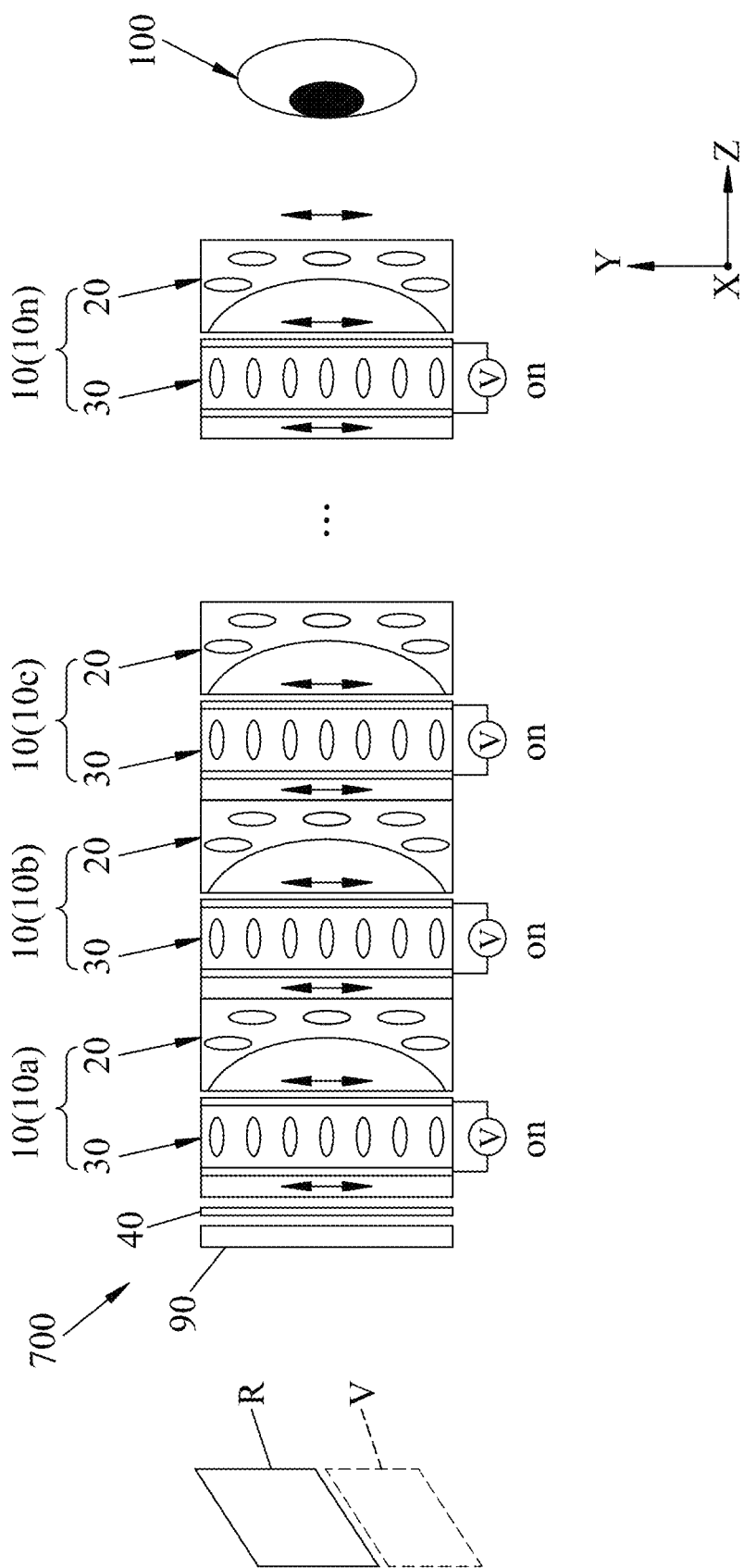
FIG. 18 is a schematic view illustrating an optical display system in accordance with an eighth embodiment of the disclosure.

FIG. 18 illustrates an optical display system 700 in accordance with an eighth embodiment of the disclosure. The optical display system 700 may include at least one varifocal lens device 10 and an augmented reality device 90 disposed to permit a combined image from the augmented reality device 90 to be directed to a viewer (represented by an eye 100) through the at least one varifocal lens device 10. The combined image may include an image of a real world object (R) and a virtual image (V).

The augmented reality device 90 may be any commercial augmented reality device, or the aforesaid optical display systems 500, 600.

In some embodiments, the optical display system 700 may include a polarizer 40 which is disposed between the augmented reality device 90 and the at least one varifocal lens device 10, and which is configured to transform a light beam contributing to the combined image into a linearly polarized light for passing through the at least one varifocal lens device 10.

In some embodiments, as shown in FIG. 18, the optical display system 700 includes a plurality of the varifocal lens devices 10a to 10n. The function of the varifocal lens devices 10a to 10n is similar to that described for the corrective lens assembly 300. That is, the total optical power of the varifocal lens devices 10a to 10n can be adjusted according to a required visual correction of the viewer's eye 100. Therefore, when viewing a combined image using the optical display system 700, the viewer may directly view the combined image without wearing eyeglasses or the like for vision correction.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A corrective lens assembly for daily vision correction, comprising:
    a stack including a plurality of varifocal lens devices, each of said varifocal lens devices including
    a lens unit including a polarization-dependent lens, and having different optical powers for different polarization directions of light, and
    a polarization controller which is coupled to said lens unit, and which is electrically driven to switch between a first state and a second state, such that when a light beam is introduced along an optical axis in a Z direction through said polarization controller in the first state, a polarization direction of the light beam is converted by said polarization controller, and such that when the light beam is introduced along the optical axis through said polarization controller in the second state, the polarization direction of the light beam is prevented from being converted by said polarization controller; and
    a polarizer configured to transmit a linearly polarized light to said varifocal lens devices, said polarization controller and said lens unit of each of said varifocal lens devices being disposed proximate to and distal from said polarizer, respectively.

2. An optical display system comprising:
    a stack including a plurality of varifocal lens devices, each including
    a lens unit including a polarization-dependent lens, and having different optical powers for different polarization directions of light, and
    a polarization controller which is coupled to said lens unit, and which is electrically driven to switch between a first state and a second state, such that when a light beam is introduced along an optical axis in a Z direction through said polarization controller in the first state, a polarization direction of the light beam is converted by said polarization controller, and such that when the light beam is introduced along the optical axis through said polarization controller in the second state, the polarization direction of the light beam is prevented from being converted by said polarization controller; and
    a display disposed to provide a light to pass through said varifocal lens devices, said polarization controller and said lens unit of each of said varifocal lens devices being disposed proximate to and distal from said display, respectively.

3. The optical display system of claim 2, further comprising a polarizer disposed between said display and said stack.

4. The optical display system of claim 2, further comprising a fixed focal lens disposed downstream of said display so as to permit the light from said display to be transmitted to a viewer through said fixed focal lens and said varifocal lens devices.

5. The optical display system of claim 2, further comprising a beam splitter disposed to combine a light from a real world object and the light from said display and outputted from said varifocal lens devices.

6. The optical display system of claim 5, wherein said beam splitter is a polarization-independent beam splitter.

7. The optical display system of claim 5, wherein said beam splitter is disposed to partially transmit the light from the real world object from a front side of said beam splitter, and said display is disposed at one of left and right sides of said beam splitter.

8. The optical display system of claim 7, wherein said varifocal lens devices are disposed between said beam splitter and said display.

9. The optical display system of claim 8, further comprising a fixed focal lens which is disposed to permit the light from said display to be directed toward said beam splitter through said varifocal lens devices and said fixed focal lens.

10. The optical display system of claim 7, wherein said beam splitter is disposed between said varifocal lens devices and said display, said optical display system further comprising a fixed focus mirror disposed outside of said varifocal lens devices so as to permit the light from said display and passing through said beam splitter and said varifocal lens devices to be reflected by said fixed focus mirror back to said beam splitter.

11. An optical display system comprising:
    at least one varifocal lens device including
    a lens unit including a polarization-dependent lens, and having different optical powers for different polarization directions of light, and
    a polarization controller which is coupled to said lens unit, and which is electrically driven to switch between a first state and a second state, such that when a light beam is introduced into said varifocal lens device along an optical axis in a Z direction through said polarization controller in the first state, a polarization direction of the light beam is converted by said polarization controller, and such that when the light beam is introduced into said varifocal lens device along the optical axis through said polarization controller in the second state, the polarization direction of the light beam is prevented from being converted by said polarization controller;
    a display disposed to provide a light to pass through said at least one varifocal lens, said polarization controller and said lens unit of said at least one varifocal lens device being disposed proximate to and distal from said display, respectively; and
    a beam splitter disposed to combine a light from a real world object and the light from said display and outputted from said at least one varifocal lens device,
    wherein said beam splitter is disposed to partially transmit the light from the real world object from a front side of said beam splitter, and said display is disposed at one of left and right sides of said beam splitter; and wherein said beam splitter is disposed between said at least one varifocal lens device and said display, said optical display system further comprising a fixed focus mirror disposed outside of said at least one varifocal lens device so as to permit the light from said display and passing through said beam splitter and said least one varifocal lens device to be reflected by said fixed focus mirror back to said beam splitter.

\* \* \* \* \*